(12) United States Patent
Kok et al.

(10) Patent No.: US 6,642,932 B2
(45) Date of Patent: Nov. 4, 2003

(54) METHOD AND SYSTEM FOR INTERPOLATION IN COLOR IMAGES

(75) Inventors: Chi Wah Kok, Clear Water Bay (HK); Suk Han Lam, Kwun Tong (HK)

(73) Assignee: The Hong Kong University of Science and Technology (HK)

( * ) Notice: Subject to any disclaimer, the term of this patent is extended or adjusted under 35 U.S.C. 154(b) by 224 days.

(21) Appl. No.: 09/950,636

(22) Filed: Sep. 13, 2001

(65) Prior Publication Data

US 2003/0048279 A1 Mar. 13, 2003

(51) Int. Cl.$^7$ ................................................. G09G 5/00
(52) U.S. Cl. ........................ 345/606; 345/609; 345/589
(58) Field of Search ............................... 345/606, 608, 345/609, 610, 589, 600

(56) References Cited

U.S. PATENT DOCUMENTS 6,356,276 B1 * 3/2002 Acharya ...................... 345/600

OTHER PUBLICATIONS

Ed Chang, "Color Filter Array Recovery Using a Threshold–based Variable Number of Gradients", Jan. 1999, SPIE vol. 3650, pp. 36–43.*

Tadashi Sakamoto, "Software Pixel Interpolation for Digital Still Cameras Suitable for a 32–Bit MCU", Nov. 1998, IEEE Transactions on Consumer Electronics, vol. 44, No. 4, pp. 1342–1352.*

* cited by examiner

Primary Examiner—Matthew Luu
(74) Attorney, Agent, or Firm—Burns, Doane, Swecker & Mathis, L.L.P.

(57) ABSTRACT

A method is proposed for converting a multicolor image in which each pixel has a color intensity value for only a single color, into a full color image. For pixels for which the intensity value of a first color is known, the intensity value of a second (missing) color is interpolated as the intensity value of the first color multiplied by the local average intensity of the second color and divided by the local average intensity of the first color. Each of the intensity values of the first and second color values is determined over a set of nearest neighboring pixels. The smoothing artifact produced by the proposed method is much less than some known algorithms described above, but the computational complexity of the proposed method is low.

15 Claims, 4 Drawing Sheets

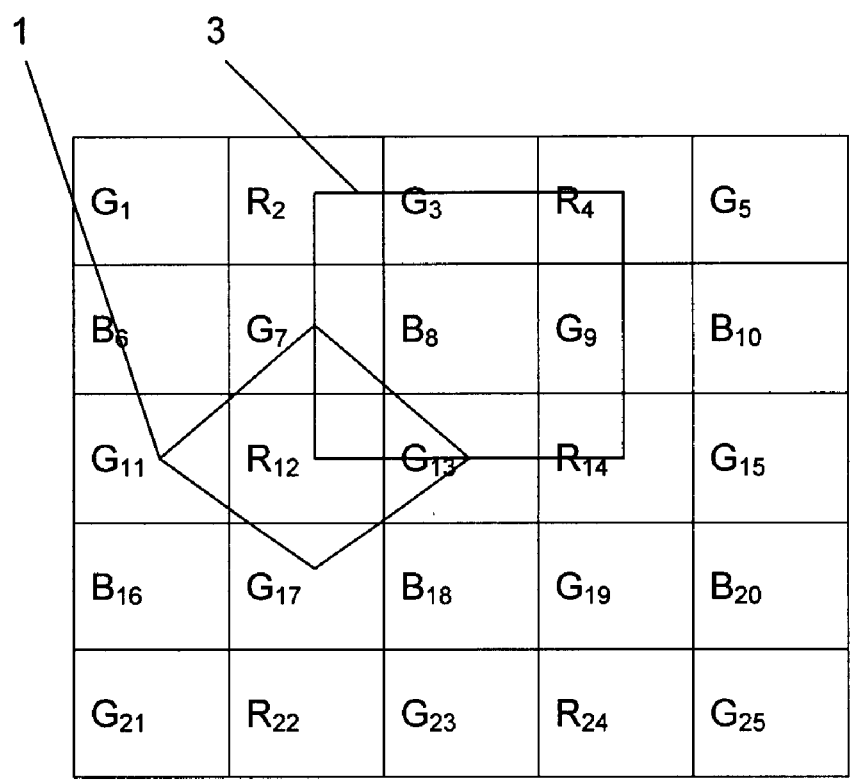

METHOD AND SYSTEM FOR INTERPOLATION IN COLOR IMAGES

FIELD OF THE INVENTION

The present invention relates to a method of converting a multicolor image in which each pixel only has a single one of the colors into a full color image. The invention further relates to apparatus employing the method.

BACKGROUND OF THE INVENTION

Due to the trichromatic nature of the human visual system, each of the pixels of "full color" digital images are associated with at least three independent information items, that is the intensities of three independent colors (e.g. red, green, and blue).

Digital cameras and video devices which create such images use an array of light sensors to collect information about an image scene, and each sensor corresponds to a respective pixel. However, to reduce cost, many such digital cameras employ a color filter array (CFA) in which each light sensor is covered by a single type of filter, and is therefore sensitive to only one of the three colors.

For example, FIG. 1 shows a 5×5 pixel section from a well-known CFA called the Bayer pattern (see U.S. Pat. No. 3,971,065 to B. E. Bayer, the disclosure of which is incorporated by reference). In FIG. 1, the pixels are numbered 1 to 25, and each pixel is marked with the corresponding color intensity value produced by the camera. The color intensity value consists of a letter (R, G or B) indicating the color to which the corresponding sensor is sensitive, and a subscript indicating the enumerated number of the pixel. Thus, for example, $G_5$ is the green color intensity of pixel five, at the top right of FIG. 1. Because the human visual system is more sensitive to green patterns than blue or red ones, there are twice as many green filters as red or blue ones.

Since each pixel in the image produced by a CFA is associated with a single color intensity value, the image is not a full-color image. However, it can be used to generate a full color image by what are called "color interpolation" (or "demosaic") algorithms. In other words, the image produced by the camera has at each pixel an intensity value for one of the three colors, and the intensity values of the two other colors (the two "missing intensity values") are estimated by the color interpolation algorithms.

For example, in one such algorithm (the "nearest neighbor" algorithm) any missing intensity value at a given pixel is estimated to be equal to the intensity value of the same color at the closest neighboring pixel which contains an intensity value for that color. A more sophisticated variant of this algorithm is the "bilinear interpolation" algorithm in which any missing intensity value at a given pixel is estimated to be the mean value of the intensity values of the same colors of the closest neighboring pixels which contain an intensity value for that color. Both these algorithms are discussed for example in an article by J. E. Adams, "Interactions between color plane interpolation and other image processing functions in electronic photography," Proceedings of SPIE, vol. 2416, pp 144–151, the disclosure of which is incorporated herein by reference in its entirety.

One of the key difficulties of such algorithms is that in the resulting image the hues of adjacent pixels can change abruptly and in an unnatural manner. To address this the "smooth hue transition interpolation" algorithm (also discussed in the article by J. E Adams mentioned above) uses bilinear interpolation to interpolate the green pixels (enough pixels have a green intensity value for this to produce good interpolation), and interpolates the red and blue intensity values at each pixel using the derived green intensity value at that pixel. Specifically, the blue intensity value at each pixel is interpolated from the green intensity value at that pixel and the blue intensity values of the nearest neighbor pixels having a blue intensity value. Interpolation of the red values is performed analogously.

The algorithms above perform averaging among neighboring pixels indiscriminately. This causes the "zipper" artifact in which a color edge is interpolated in a way which appears as a fault to a human visual system. To address this problem authors such as Sakamoto T. et al ("Software pixel interpolation for digital still camera suitable for a 32-bit MCU", IEEE Trans. Consumer Electronics, pp.1342–1352, Nov.1998) proposed an "edge sensing" algorithm in which the edges of objects in the image are estimated by noting abrupt changes in the green color intensity value, indicative of edges in objects, and attempting to interpolate the missing color intensity values of each pixel by an average only over neighboring pixels of the same object.

Other interpolations include: the color correction algorithm (see for example U.S. Pat. No. 5,629,734 to Hamilton Jr. et al.), which employs the $2^{nd}$ Laplacian derivative along possible edge directions; the variable number gradients algorithm (Chang E, Shiufun Cheung, Pan D, "Color filter array recovery using a threshold-based variable number of gradients," Proc. SPIE, vol.3650,1999, pp.36–43) which computes $1^{st}$ order Laplacian derivatives of missing colors as gradients in a localised 5×5 window centered at each pixel under consideration; and "pattern recognition algorithms" which attempt to recognise patterns within the data (see for example U.S. Pat. No. 4,630,307, to D. R. Cok).

SUMMARY OF THE INVENTION

The present invention seeks to provide new and useful methods for interpolating color intensity values, and additionally apparatus employing the methods.

The invention is motivated by the observation that there is a high degree of color correlation between different color channels in natural scenes. A simple model for color images is one of Lambertian non flat surface patches. The color signal received by the camera is the reflected signal of the surface patch from a light source with direction vector l, and it is reasonable to assume that the reflective surface is homogenous, so that the received signal at spatial location (x, y) can be written as:

$$I_R(x, y) = c_R(x, y) N(x, y) \cdot l \quad (1)$$

$$I_G(x, y) = c_G(x, y) N(x, y) \cdot l \quad (2)$$

$$I_B(x, y) = c_B(x, y) N(x, y) \cdot l \quad (3)$$

where N(x, y) is the surface normal, and $c_i(x, y)$ (for i equal to one of R, G or B) is the albedo capturing the characteristics of the reflective materials. Thus the dot product N(x, y)·l is the reflected light level. If the reflective surface is homogenous in a localised region $c_i(x, y) = c_i$, therefore:

$$\frac{I_i(x, y)}{I_j(x, y)} = \frac{c_i(x, y)}{c_j(x, y)} = \frac{c_i}{c_j}, \quad (4)$$

which is constant. That is, the color ratio within a given object in a localised region is constant. The present inventors have found experimentally that the above model is consistent with image data collected from natural scenes.

In general terms the present invention proposes that for a pixel for which an intensity value of a first color is known, the intensity value of a second (missing) color is interpolated as the known intensity value of the first color multiplied by the local average of the second color and divided by the local average of the first color. Each of the intensity values of the first and second color values is determined over a set of nearest neighboring pixels.

For example, motivated by eqn. (4) we propose that for a pixel $k$ having a known red color intensity value $R_k$, the missing local green intensity value $G_k$ is interpolated as:

$$G_k = \frac{\overline{G} R_k}{\overline{R}} \quad (5)$$

where $\overline{G}$ and $\overline{R}$ are the average green color and red color in the localised region. The value $\overline{G}/\overline{B}$ thus constitutes a color correction factor, relating the known red color intensity value $R_k$ and the missing local green intensity value $G_k$.

Similarly, $B_k$ can be estimated by replacing $G_k$ with $B_k$ and $\overline{G}$ with $\overline{R}$. Of course, in pixels $k$ in which is known, $G_k$ takes the place of $R_k$ in equation (5) and $\overline{G}$ takes the place of $\overline{R}$, and they used to derive $R_k$ and $B_k$. Similarly in pixels $k$ in which $B_k$ is known, $B_k$ takes the place of $R_k$ in equation (5) and $\overline{B}$ takes the place of $\overline{R}$, and is used to derive $R_k$ and $G_k$.

Each of the averages $\overline{B}$, $\overline{G}$ and $\overline{R}$ is calculated over a respective set of neighboring pixels for which the corresponding color intensity value is a known value (i.e. not a missing color intensity value). It is preferable that these sets of pixels are small (e.g. only 4 pixels each), to minimise unnecessary color smoothing. The respective sets of pixels for calculating $\overline{B}$, $\overline{G}$ and $\overline{R}$ span respective areas (here called "windows"; we may for example define each window precisely as the convex hull of the centres of the pixels in the set) in the image which in general overlap. Preferably, in the case of set s of 4 pixels, the windows are square. In the case of the color having a known color intensity value in the pixel under consideration, the set of pixels used to find the local average of the intensity value of this color preferably includes the known pixel itself.

To find all the missing color values for a given pixel, a number of windows is formed which is equal to the total number of colors in the image. Preferably, the proportional overlap of these windows should be high, to improve the accuracy of the color correction factor, which is just the weighted average ratio of the color intensities for different color channels of the overlapping windows.

Averaging the color intensities results in a smoothing artifact since if there is an edge in the windows the average is supported by pixels to either side of the edge. Having said that, this factor applies to both the averages over $\overline{G}$ and $\overline{R}$, so these effects largely cancel each other when their ratio is taken. Since eqn (5) also contains $R_k$, the interpolated value of $G_k$ should be highly sensitive to which side of the edge the k-th pixel lies in.

Thus, in general terms, in the present invention the known color intensity values give an accurate positioning of the edges, and these edges support the interpolation of the missing color values. For this reason the smoothing artifact produced by the present invention is much less than, for example, in the bilinear interpolation algorithm described above. On the other hand, the computational complexity of the present algorithm is about the same.

Specifically, one expression of the invention is a method for processing a digitized image having pixels aligned in rows and columns and having color intensity values for each of a plurality of colors, each pixel having a color intensity value for only one of the colors, the method including for successive first pixels:

deriving a first local average value, which is the local average value of the color intensity value of the color which is present in the first pixel;

deriving a respective local average value of each of the other colors;

for each of the other colors deriving a respective color correction factor proportional to the local average of that other color and inversely proportional to the first local average value; and deriving an interpolated color intensity value for each of the other colors as the color intensity value of the color which is present in the first pixel multiplied by the respective color correction factor.

Naturally, this definition includes any mathematically equivalent series of operations.

The local average values of each color are determined using, for each color, a set of pixels in the neighborhood of the first pixel and having a color intensity value for that color. In the case of the color for which the first pixel has a color intensity value, the set of pixels for that color may include the first pixel itself. Each of the local average values is then found as an average over the color intensity values of the corresponding set of pixels.

Note that this "average" may simply be the arithmetic mean of the set of color intensity values of the set. However, it is not limited in this respect, and may for example be a different average, such as the median. Alternatively, the "average" may give a different weight to the color intensity values of different ones of the set of pixels.

BRIEF DESCRIPTION OF THE FIGURES

Further preferred features of the invention will be described below for the sake of example only with reference to a non-limiting embodiment of the invention and in relation to the following figures in which:

FIG. 1 illustrates the known Bayer color filter array;

FIG. 2 illustrates interpolation by the embodiment of a missing color value of a first pixel;

DETAILED DESCRIPTION OF THE EMBODIMENT

Figure 3:
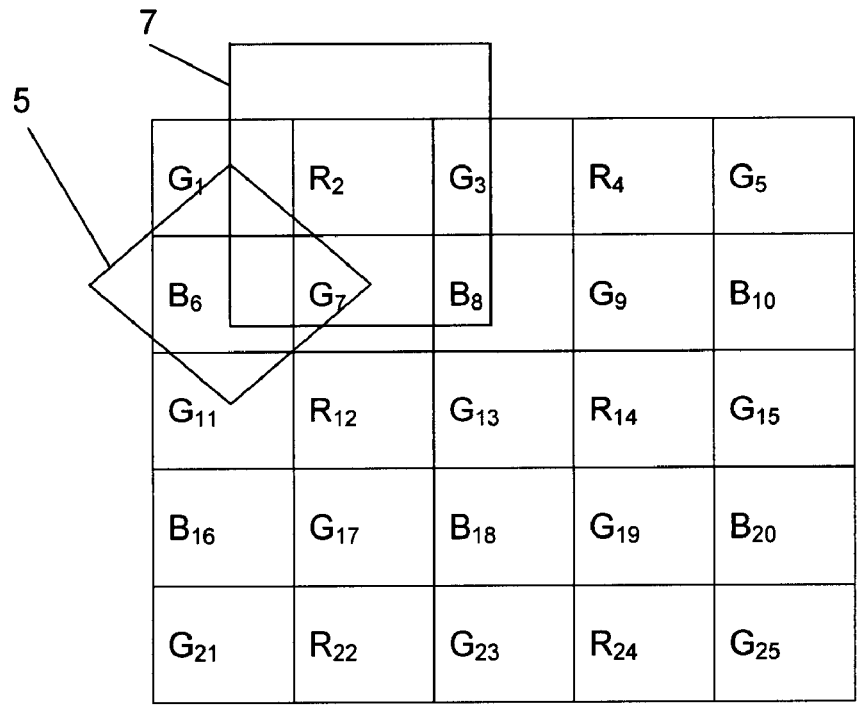
FIG. 3 illustrates interpolation by the embodiment of a missing color value of a second pixel.

The embodiment of the invention will be described here in detail with reference to a CFA which is the Bayer CFA pattern of FIG. 1, but the invention is not limited in this respect. Furthermore, the embodiment will be described in the case that the 25 pixels shown in FIG. 1 constitute the entire pixel array, but in practical applications the pixel array will of course be very much larger.

Considering firstly pixel k=12, for which the red color intensity value $R_{12}$ is known, and the green color intensity value $G_{12}$ and the blue color intensity value $B_{12}$ are unknown (missing) and are to be interpolated by the embodiment.

FIG. 2 illustrates the windows 1, 3 used by the embodiment to find respectively the local values of $\overline{G}$ and $\overline{R}$ at the k=12 pixel. The value $\overline{G}$ is found from averaging the known green color intensity values $G_7$, $G_{11}$, $G_{13}$, and $G_{17}$ of the set of four pixels which form the corners of the window 1, and the value $\overline{R}$ is found from averaging the known green color intensity values $R_2$, $R_4$, $R_{12}$, and $R_{14}$ of the set of four pixels which form the corners of the window 3. The embodiment uses the values of $\overline{G}$ and $\overline{R}$ to derive a value for the green color intensity value $G_{12}$ of the same k=12 pixel using eqn. (5).

Note that since the four nearest neighbors of the k=12 pixel (i.e. pixels 7, 11, 13 and 17) all have a known green color intensity value, we have been able to choose the window 1 as a diamond of relatively low area actually centred on the k=12 pixel. By contrast, the window 3 is not centred on the pixel under consideration (i.e. pixel k=12), but we have arbitrarily chosen it to extend from pixel 12 towards the top right direction. Indeed, in this embodiment we will always choose all windows which cannot be centred on the pixel under consideration, to extend towards the top right of that pixel. By consistently choosing all the windows to extend from the first pixel in the same direction, we maximise the proportion of the overlapping portions of the windows, for the same area of each of the windows.

Note that it would alternatively and equivalently be possible to choose the windows to extend consistently to the top left of the pixel presently under consideration, to the bottom left or to the bottom right. Furthermore, it would be possible to choose the window 3 to be larger and centred on the pixel 12, but this is less preferable since a larger window 3 means more smoothing.

Consider now the k=6 pixel, for which only the blue color value $B_6$ is known. FIG. 3 illustrates the windows 5, 7 used by the embodiment to find respectively the local values of $\overline{G}$ and $\overline{B}$ at the k=6 pixel. Thus, once again, each of the values $\overline{G}$ and $\overline{B}$ is found as an average of the known color intensity values of the respective color in a respective set of 4 pixels. $G_6$ is then interpolated by the analogue to eqn. (5), that is:

$$G_6 = \frac{B_6 \overline{G}}{\overline{B}}. \quad (6)$$

Figure 6:
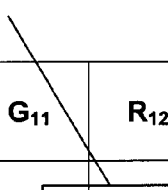
FIG. 6 illustrates an extended pixel array employed by the embodiment.

FIG. 3 illustrates a possible boundary problem of the embodiment, that some pixels windows (such as window 7) extend outside the pixel array. To deal with such a case we derive an "extended" pixel array shown in FIG. 6 in which the pixels shown in bold are added. Each of these added pixels is associated with a known color intensity value marked in FIG. 6, and equal to the known color intensity value of one of the pixels of FIG. 1. Notice that the extended image follows the Bayer CFA pattern, and that the extended image is symmetric, so as to preserve the linearity of the color signal. The window 7 is entirely included in the extended pixel array of FIG. 6, and the local value of $\overline{B}$ is found from the average of the blue color values of the four corners of window 7 in FIG. 6. In fact, this means that the value of $\overline{B}$ will just be the average of $B_6$ and $B_8$, since each of these two values constitute the values of two corners of window 7 in FIG. 6.

Figure 4:
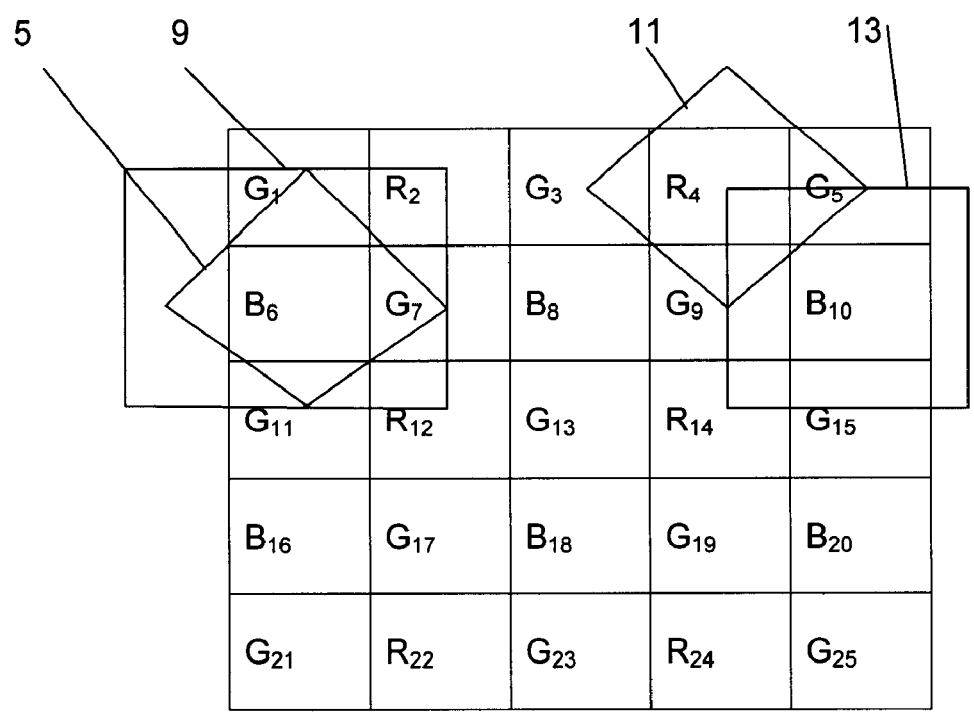
FIG. 4 illustrates interpolation by the embodiment of respective missing color values of a third and fourth pixel.
Figure 5:
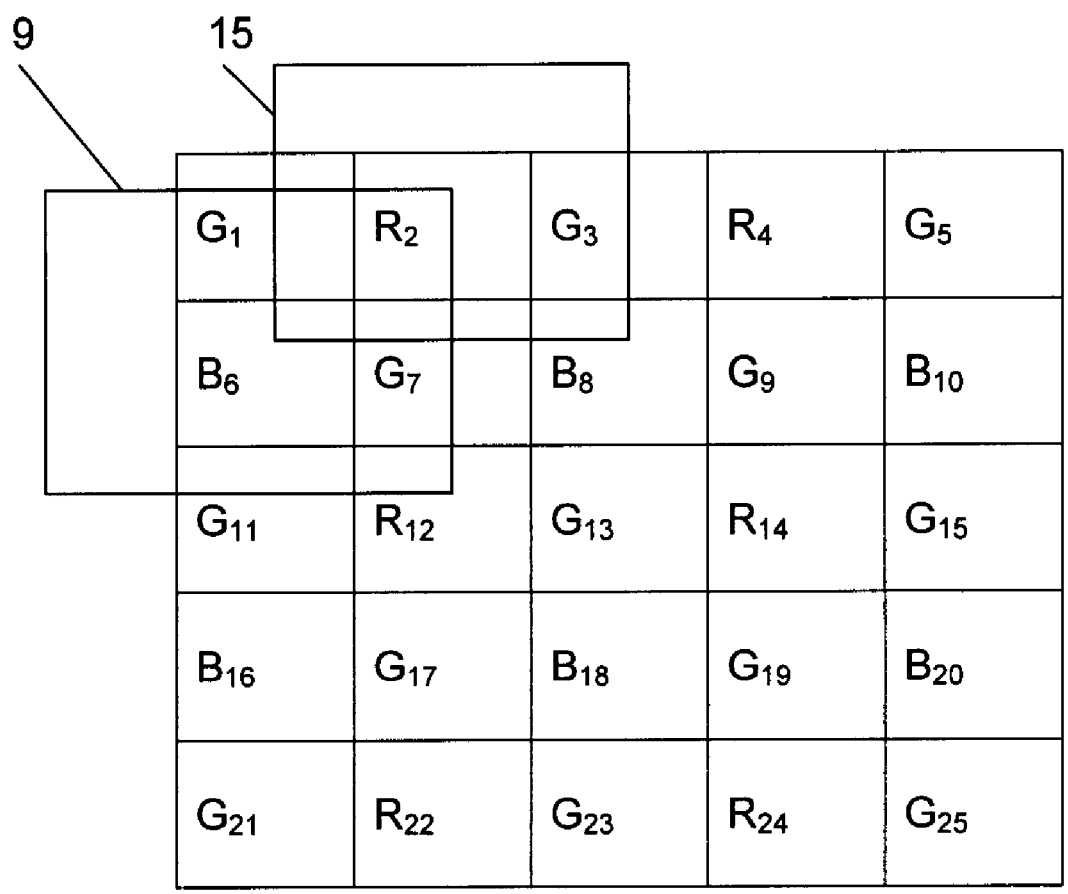
FIG. 5 illustrates interpolation by the embodiment of a missing color value of a fifth pixel.

FIG. 4 shows the windows 5, 9 used to interpolate a value for $R_{11}$, and the windows 11, 13 used to interpolate a value for $R_9$. Note that the directions in which the windows 5, 9 extend from pixel 11 are such that areas 5 and 9 have a maximal proportional overlapping area. FIG. 5 illustrates the windows 9, 15 used to interpolate a value for $R_6$. FIGS. 2 to 5 show all the possible cases of local window formation (i.e. all the possible relationships between the two windows which are formed to find each interpolated value).

We performed experimental tests of the embodiment using benchmark images (commonly called "rose", "lily" and "BMW") sampled using the Bayer CFA pattern. Since there exists no known quantitative parameter characterising the quality of interpolation and incorporating the characteristics of the human visual system, the results were compared for subjective quality using visual inspection alone.

All the algorithms discussed in the background section of this document produced full-color images with reasonable quality. However, careful observation revealed that the full color image produced by the nearest neighbor algorithm has the worst resolution and has the roughest object edges. The bilinear interpolation algorithm tended to over-smooth the color image. The smooth hue transition interpolation algorithm (and its variant the "smooth log hue transition interpolation algorithm"), the edge sensing interpolation algorithm (and its variant the "log edge sensing interpolation algorithm") perform badly in finely detailed areas of the color image. In particular, dark dots were observed in areas of the lily image with fine detail. These results indicate that the algorithms tend to over estimate the color value in areas of fine detail. The variable number gradients interpolation algorithm produces pleasing results but imposes a huge computational penalty. The pattern recognition interpolation algortihm is capable of producing good quality full color images, but the resulting images have diffused color, which results in loss of color contrast. The full color images produced by the embodiment have good color contrast, and retain small features, including color edges. Visually pleasing results are observed which are comperable or even better than those of the variable number gradients algorithm. However, the computational complexity of the propposed algorithm is much lower when compared to those of the variable number gradients algorithm, and is considered to be comparable to those of the bilinear interpolation algorithm.

Although only a single embodiment of the invention has been described above, many variations are possible within the scope of the invention as will be apparent to a skilled reader.

A particular field of application of the present invention is in the construction of a digital camera system, which includes a digital camera having the sensor array which generated the image. The proposed method may be used by a processor physically located within the digital camera, or alternatively the image can be transmitted from the camera to a computer where it is processed by a method according to the invention. Both of these possibilities can be implemented by known techniques. For example, in a system built by the present inventors, the captured image data in the flash memory of a digital camera was transmitted to a PC as an image of 642×482 pixels, which means one scanline has 642 bytes of data and there are a total of 482 scanlines in an image. A method according to the invention was then performed within the PC.

What is claimed is:

1. A method for processing a digitized image having pixels aligned in rows and columns and having color intensity values for each of a plurality of colors, each pixel having a color intensity value for only one of the colors, the method including for successive first pixels:

deriving a first local average value, which is the local average value of the color intensity value of the color which is present in the first pixel;

deriving a respective local average value of each of the other colors;

for each of the other colors deriving a respective color correction factor proportional to the local average of that other color and inversely proportional to the first local average value; and deriving an interpolated color intensity value for each of the other colors as the color intensity value of the color which is present in the first pixel multiplied by the respective color correction factor.

2. A method according to claim 1 in which each local average value is an average of the color intensity values of a respective set of pixels proximate the first pixel and each having a color intensity value for the corresponding color.

3. A method according to claim 2 in which each local average is the arithmetic mean of the color intensity values of the respective set of pixels.

4. A method according to claim 2 in which the set of pixels used to derive the first local average value includes the first pixel.

5. A method according to claim 2 in which for each of the other colors, the set of pixels includes only the pixels which are closest to the first pixel and which have a color intensity value for the corresponding other color.

6. A method according to claim 2 in which each set of pixels includes four pixels.

7. A method according to claim 2 in which the sets of pixels are selected to maximise the proportional overlap of the respective areas of the image which are spanned by different ones of the sets of pixels.

8. A method according to claim 2 further including supplementing the image at its edges by additional pixels each having a color intensity value for one of the colors, in the case of at least some first pixels which are proximate to the edges of the image the sets of pixels including the additional pixels.

9. A method according to claim 8 in which the color intensity values of the additional values are set to be equal to color intensity values of corresponding pixels of the original image.

10. A method according to claim 9 in which the additional pixels and the corresponding pixels of the original image are determined by a symmetry criterion.

11. A method according to claim 1 in which the colors present in the pixels of the image are a Bayer color filter array pattern.

12. Apparatus for processing a digitized image having pixels aligned in rows and columns and having color intensity values for each of a plurality of colors, each pixel having a color intensity value for only one of the colors, the apparatus including:

a storage device for storing the image; and a processor for processing successive first pixels of the image, the processor having:

means for deriving a first local average value, which is the local average value of the color intensity value of the color which is present in the first pixel;

means for deriving a respective local average value of each of the other colors;

means for deriving a respective color correction factor for each of the other colors, the color correction factor being proportional to the local average of that other color and inversely proportional to the first local average value; and means for deriving an interpolated color intensity value for each of the other colors as the color intensity value of the color which is present in the first pixel multiplied by the respective color correction factor.

13. Apparatus according to claim 12 which is a digital camera including a sensor array for generating the digital image.

14. A method for processing a digitized image having an array of pixels and having color intensity values for each of a plurality of colors, each pixel having a color intensity value for only one of the colors, the method including for successive first pixels:

for each of the colors defining a corresponding set of pixels in the neighbourhood of the first pixel, each of the pixels of each set having a color intensity value for the corresponding color, using the color intensity values of each set of pixels to derive a respective local intensity value for that color;

deriving an interpolated color intensity value for each of the colours which is not present in the first pixel, each interpolated colour intensity value being: (i) proportional to the local intensity value of the corresponding color, (ii) proportional to the color intensity value of the color which is present in the first pixel, and (iii) inversely proportional to the local intensity value of the color which is present in the first pixel.

15. Apparatus for processing a digitized image having an array of pixels and having color intensity values for each of a plurality of colors, each pixel having a color intensity value for only one of the colors, the apparatus including:

a storage device for storing the image; and a processor for processing successive first pixels of the image, the processor having:

means for defining for each of the colors a corresponding set of pixels in the neighbourhood of the first pixel, each of the pixels of each set having a color intensity value for the corresponding color, means for using the color intensity values of each set of pixels to derive a respective local intensity value for that color; and means for deriving an interpolated color intensity value for each of the colours which is not present in the first pixel, each interpolated colour intensity value being: (i) proportional to the local intensity value of the corresponding color, (ii) proportional to the color intensity value of the color which is present in the first pixel, and (iii) inversely proportional to the local intensity value of the color which is present in the first pixel.

* * * * *